United States Patent [19]

Shibayama et al.

[11] Patent Number: 5,530,593

[45] Date of Patent: Jun. 25, 1996

[54] ZOOM LENS

[75] Inventors: Atsushi Shibayama, Kawasaki; Susumo Sato, Chiba, both of Japan

[73] Assignee: Nikon Corporation, Tokyo, Japan

[21] Appl. No.: 115,811

[22] Filed: Sep. 3, 1993

[30] Foreign Application Priority Data

Sep. 11, 1992 [JP] Japan .................................. 4-242485
Oct. 6, 1992 [JP] Japan .................................. 4-267173

[51] Int. Cl.⁶ ........................... G02B 15/14; G02B 27/64
[52] U.S. Cl. ........................... 359/689; 359/554; 359/686
[58] Field of Search .................................. 359/689, 686, 359/554

[56] References Cited

U.S. PATENT DOCUMENTS

| | | | |
|---|---|---|---|
| 4,480,467 | 6/1989 | Takada et al. | 350/427 |
| 4,927,250 | 5/1990 | Suda | 350/500 |
| 5,000,549 | 3/1991 | Yamazaki | 350/423 |
| 5,039,211 | 8/1991 | Maruyama | 359/557 |
| 5,121,978 | 6/1992 | Maruyama | 359/557 |

FOREIGN PATENT DOCUMENTS 4135807  5/1992  Germany.

OTHER PUBLICATIONS

Patent Abstracts of Japan, vol. 14, No. 317 (P–1073), 9 Jul. 1990 (JP–A–21 03 014).

*Primary Examiner*—Scott J. Sugarman
*Attorney, Agent, or Firm*—Shapiro and Shapiro

[57] ABSTRACT

A zoom lens includes a first lens group having positive refractive power, a second lens group having positive refractive power, and a third lens group having negative refractive power. In zooming from the wide-angle end to the telephoto end, the distance between the first and second lens groups is increased and the distance between the second and third lens groups is decreased. The second lens group includes a front group having low refractive power and a rear group having positive refractive power. The rear group is movable in a direction almost perpendicular to the optical axis.

49 Claims, 5 Drawing Sheets

ZOOM LENS

BACKGROUND OF THE INVENTION

1. Field of the Invention

The present invention relates to a zoom lens suitable for a still or video camera and, more particularly, to a zoom lens having a hand shake preventive function.

2. Related Background Art

Various conventional lenses suitable for correcting blurring have been proposed. As disclosed in U.S. Pat. No. 4,927,250, in a zoom lens of these conventional lenses, a hand shake preventive optical system is proposed wherein a variable vertex angle prism is located on the object side of the zoom lens to deflect an image, and an aberration generated by this prism is corrected by moving an aberration correction optical element in a zoom lens system.

To correct blurring of the photographic frame upon inclination of a lens system during photography, the vertex angle of the variable vertex prism and the position of the aberration correction optical system must be simultaneously controlled. It is, therefore, an object of the present invention to provide a zoom lens wherein blurring can be corrected by moving only one of the lens groups constituting the zoom lens, and imaging performance is not degraded by hand shake prevention.

SUMMARY OF THE INVENTION

In order to achieve the above object according to an aspect of the present invention, there is provided zoom lens including a first lens group $G_1$ having positive refractive power, a second lens group $G_2$ having positive refractive power, and a third lens group $G_3$ having negative refractive power, which are arranged from the object side, wherein a distance between the first and second lens groups $G_1$ and $G_2$ is increased, and a distance between the second and third lens groups $G_2$ and $G_3$ is decreased upon zooming from the wide-angle end to the telephoto end.

The second lens group $G_2$ includes a front group $G_F$ having low refractive power and a rear group $G_R$ having positive refractive power which are arranged from the object side.

The rear group $G_R$ is arranged to be movable in a direction almost perpendicular to an optical axis.

As described above, according to the present invention, the second lens group $G_2$ having the positive refractive power is divided into the front group $G_F$ and the rear group $G_R$, and only the rear group $G_R$ having the positive refractive power is moved in the direction almost perpendicular to the optical axis, thereby correcting blurring of the photographic frame which is caused by hand shaking or the like. With this arrangement, since the blur correction lens group is located inside the lens system, only a small external force acts on the blur correction lens group and a blur correction actuator for moving the blur correction lens group in the direction almost perpendicular to the optical axis. Therefore, the hand shake preventive mechanism can be properly actuated, and the occurrence of mechanical failures can be reduced.

The zoom lens according to the present invention may be arranged such that the distance between the front group $G_F$ and the rear group $G_R$ may be changed when the magnification is changed from the wide-angle end to the telephoto end.

In addition to the above arrangement, the zoom lens according to the present invention is preferably arranged to satisfy the following conditions:

$$0.02 \leq KW/H \leq 0.1 \tag{1}$$

$$0.02 \leq KT/(Z \cdot H) \leq 0.1 \tag{2}$$

for $KW=(eRW+e3W)/fR-eRW \cdot e3W/(fR \cdot f3)$
$KT=(eRT+e3T)/fR-eRT \cdot e3T/(fR \cdot f3)$
$Z=fT/fW$ where fR is the focal length of the rear group $G_R$, f3 is the focal length of the third lens group $G_3$, eRW is the principal point distance between the rear group $G_R$ and the third lens group $G_3$ at the wide-angle end, eRT is the principal point distance between the rear group $G_R$ and the third lens group $G_3$ at the telephoto end, e3W is a distance between a principal point of said third lens group $G_3$ and an image point at the wide-angle end, e3T is a distance between a principal point of said third lens group $G_3$ and an image at the telephoto end, fW is the focal length of the zoom lens system as a whole at the wide-angle end, fT is the focal length of the zoom lens system as a whole at the telephoto end, and H is the maximum image height (unit: mm).

In a photographic zoom lens similar to a Leica size, conditions (6) and (7) are preferably used in place of conditions (1) and (2) described above:

$$0.5 \leq KW/H \leq 1.8 \tag{6}$$

$$0.5 \leq KT/(Z \cdot H) \leq 1.8 \tag{7}$$

A blur s of the photographic frame on the image surface is represented by equation (I) as follows, as shown in FIG. 1:

$$s = f \cdot \tan \epsilon \tag{I}$$

where f is an arbitrary focal length between the wide-angle end and the telephoto end of the zoom lens and $\epsilon$ is the inclination of the zoom lens as a whole on the plane including the optical axis of the zoom lens. If the inclination $\epsilon$ is sufficiently smaller than unity, the blur s is represented by the following equation:

$$s = f \cdot \epsilon \tag{I'}$$

As shown in FIG. 2, if the focal length of the rear group of the second lens group, the focal length of the third lens group, the principal point distance between the rear group of the second lens group and the third lens group at an arbitrary focal length f of the zoom lens, the distance between the principal point of the third lens group and the image point, and the moving amount of the rear group of the second lens group for performing blur correction in a direction perpendicular to the optical axis are defined as fR, f3, eR, e3, and x, respectively, paraxial rays are deflected at an angle θ1 by the rear group of the second lens group. An exit angle θ1 of light emerging from the rear group of the second lens group is represented by equation (II) below. In this case, θ1 is set sufficiently smaller than unity to satisfy θ1 ≈ tan θ1.

$$\theta 1 = -x/fR \tag{II}$$

A ray height y of the ray deflected by the rear group of the second lens group at the angle θ1 and incident on the third lens group is represented by equation (III) below:

$$y = -eR \cdot \theta_1 = eR \cdot x/fR \quad \text{(III)}$$

This ray is further deflected by the third lens group by $y/f_3$, and an exit angle $\theta_2$ of the ray from the third lens group is represented by equation (IV) as follows:

In this case, $\theta_2$ is set sufficiently smaller than unity to satisfy $\theta \approx \tan\theta_2$.

$$\theta_2 = \theta_1 + (y/f_3) = (-x/fR) + (eR \cdot x)/(fR \cdot f_3) \quad \text{(IV)}$$

A ray height $z$ of the ray emerging from the third lens group and incident on the image surface is represented by equation (V) as follows:

$$\begin{aligned} z &= y - e_3 \cdot \theta_2 \\ &= \{(eR + e_3)/fR - eR \cdot e_3/(fR \cdot f_3)\} \cdot x \end{aligned} \quad \text{(V)}$$

In order to correct the image blur $s$ generated upon inclination of the zoom lens by $\epsilon$, the rear group of the second lens group can be moved to satisfy $s = -z$. At this time, $\epsilon$ and $x$ satisfy equation (VI) below in accordance with equations (I)' and (V) above.

$$x = -f \cdot \theta / \{((eR + e_3)/fR - eR \cdot e_3/(fR \cdot f_3)\} \quad \text{(VI)}$$

When the rear group of the second lens group is moved to satisfy equation (VI), hand shake prevention can be achieved.

When the rear group of the second lens group is to be mechanically moved, time lags and errors of a sensor system, an arithmetic operation circuit, a drive unit, and the like, and a play in the driver unit cause a drive error $\Delta x$. If the drive error $\Delta x$ is present, an error amount $\Delta z$ on the image surface can be expressed by equation (VII):

$$\Delta z = \{(eR + e_3)/fR - eR \cdot e_3/(fR \cdot f_3)\} \cdot \Delta x \quad \text{(VII)}$$

$(eR + e_3)/fR - eR \cdot e_3/(fR \cdot f_3)$ in equation (VII) represents a sensitivity $K$ of the error $\Delta z$ on the image surface with respect to the drive error $\Delta x$.

To arrange a zoom lens having a hand shake preventive function, an allowable error amount $\Delta z$ on the image surface varies depending on image sizes. For example, in a video or still video camera using a ⅓" CCD as compared with a camera having a so-called Leica size of 24 mm×36 mm, the error amount $\Delta z$ must be minimized. To the contrary, in a medium-format camera using a 120 film or a large-format camera having a 4"×5" film size, the allowable error amount $\Delta z$ can be large.

On the other hand, the drive error $\Delta x$ is generally proportional to the drive amount $x$. The drive amount $x$ suitable for control is almost independent of the image size. When the drive amount $x$ is excessively small, the ratio $\Delta x/x$ of the drive error increases. However, when the drive amount $x$ is excessively large, a time lag in driving increases to cause an increase in drive error. For this reason, to arrange a zoom lens having a hand shake preventive function, an optimal sensitivity $K$ varies depending on image sizes.

The conditions of the present invention will be described below.

Conditions (1) and (2) define a relationship between a maximum frame image height $H$ (unit: mm) and a sensitivity $K$ of $\Delta z$ as a function of $\Delta x$ defined by equation (VII).

Condition (1) defines a relationship between the maximum image height $H$ and a sensitivity $KW$ at the wide-angle end. When the value exceeds the upper limit of condition (1), the sensitivity $KW$ becomes excessively large. High-precision driving for hand shake prevention is then required to make it difficult to perform proper control.

To the contrary, when the value is smaller than the lower limit of condition (1), the drive amount of the lens group in hand shake prevention must be increased. For this reason, a drive unit for a hand shake group becomes bulky, and a time lag in driving increases. In addition, a blur angle $\epsilon$ capable of performing hand shake prevention is small to disable sufficient hand shake prevention.

Similarly, condition (2) defines a relationship between the maximum image height $H$ and a sensitivity $KT$ at the telephoto end. When the value is larger than the upper limit or smaller than the lower limit of condition (2), the same problems described above are also posed. The zoom ratio $Z$ is used in condition (2) because a change in focal length $f$ even at the same blur angle $e$ produces different blur amounts $s$ on the frame as can be seen from equation (I)'. The different blur amounts $s$ indicate different blur correction amounts $z$ on the image surface. When a zoom lens is arranged such that the sensitivity $KW$ at the wide-angle end is set lower than the sensitivity $KT$ at the telephoto end, the difference in drive amount $x$ of the hand shake prevention group between the wide-angle and telephone ends can be conveniently set small. At this time, it is more preferable to satisfy condition (VIII) as follows:

$$KW \leq KT \leq KW \cdot Z \quad \text{(VIII)}$$

for $KW = (eRW + e3W)/fR - eRW \cdot e3W/(fR \cdot f_3)$ $KT = (eRT + e3T)/fR - eRT \cdot e3T/(fR \cdot f_3)$ $Z = fT/fW$ Note that condition $KT = KW \cdot Z$ makes it possible to set the drive amount $x$ of the hand shake prevention group at the wide-angle end with respect to the blur angle $\epsilon$ equal to that at the telephoto end.

If any one of the lenses of a lens system is decentered regardless of a zoom or single-focal-length lens, the image formation performance of the lens system is generally degraded. In this case, if the lens system subjected to decentering has no aberration, the image formation performance is not degraded.

It is, however, difficult to eliminate all the aberrations in an actual lens group. It is almost impossible to eliminate aberrations from particularly a zoom lens in consideration of the size of the zoom lens as a whole and aberration correction of the zoom lens as a whole.

In a hand shake prevention lens group of the zoom lens of the present invention, a comma and an astigmatism which are associated with degradation of the image formation performance upon decentering of the lens system are corrected as much as possible. Degradation of the image formation performance in hand shake prevention can be minimized.

More specifically, the hand shake prevention rear group $G_R$ is preferably constituted by at least one positive lens element $LR1$, at least one negative lens element, and at least one positive lens element in an order from the object side. Therefore, the degree of freedom in aberration correction can be assured.

At this time, the positive lens element $LR_1$ preferably satisfies the following condition:

$$0.1 \leq D/fR \leq 0.3 \quad \text{(3)}$$

where $fR$ is the focal length of the rear group $G_R$ and $D$ is the thickness of the positive lens element LR1 on the axis.

In the above arrangement of the rear group $G_R$ of the second lens group $G_2$, condition (3) determines an optimal range of the lens thickness $D$ of the positive lens LR1 on the axis, which lens is closest to the object side in the rear group $G_R$. When the value is smaller than the lower limit of condition (3), it is difficult to correct both the comma and the astigmatism in the third lens group $G_3$. On the other hand, when the value is larger than the upper limit of condition (3), the thickness of the rear group $G_R$ on the axis must be increased to result in a bulky zoom lens and fail to ensure an interface between lens groups in zooming.

The positive lens element LR1 preferably satisfies the following condition:

$$-1.2 \leq R/fR \leq -0.2 \qquad (4)$$

where R is the radius of curvature of the object-side lens surface of the positive lens element LR1.

Condition (4) defines an optimal range of radii R of curvature on the object-side lens surface of the positive lens element LR1. If the value is larger than the upper light or smaller than the lower limit of condition (4), it is difficult to correct both the comma and the astigmatism with a good balance.

To arrange the rear group $G_R$ of the second lens group $G_2$ as described above, a stop S is preferably located between the front group $G_F$ and the rear group $G_R$ of the second lens group $G_2$.

To properly correct the chromatic aberration on the axis and the chromatic aberration of magnification from the wide-angle end to the telephoto end of the zoom lens and to minimize a change in chromatic aberration of magnification upon decentering of the rear group $G_R$ so as to prevent the hand shake, the rear group $G_R$ is preferably subjected to a sufficient achromatic treatment.

In addition to the above arrangement, the zoom lens according to the present invention preferably satisfies the following condition:

$$40 \leq \nu P - \nu N \qquad (5)$$

where $\nu P$: average value of Abbe number of the positive lens in the rear group $G_R$ $\nu N$: average value of Abbe number of the negative lens in the rear group $G_R$ Condition (5) is a condition for obtaining a sufficient achromatic rear group $G_R$ of the second lens group $G_2$. When the value is smaller than the lower limit of condition (5), it is difficult to correct both the chromatic aberration on the axis and the chromatic aberration of magnification of the zoom lens as a whole. In addition, when the rear group $G_R$ of the second group $G_2$ is decentered, the chromatic aberration of magnification becomes large to cause degradation of the image formation performance.

Note that proper correction of both the chromatic aberrations and the comma is preferably performed by bonding any positive lens and any negative lens in the rear group $G_R$ of the second lens group $G_2$.

According to the present invention, there can be provided a zoom lens which has a simple blur correction structure and a compact arrangement with excellent image formation performance and can minimize degradation of the image formation performance upon hand shake prevention.

The above and other objects, features, and advantages of the present invention will be apparent from the following detailed description in conjunction with the accompanying drawings.

DESCRIPTION OF THE PREFERRED EMBODIMENTS

Preferred embodiments of the present invention will be described with reference to the accompanying drawings.

Each embodiment of the present invention has a first lens group $G_1$ having positive refractive power, a second lens group $G_2$ having positive refractive power, and a third lens group $G_3$ having negative refractive power in the order from the object side. The second lens group $G_2$ has a front group $G_F$ having low positive or negative refractive power and a rear group $G_R$ having positive refractive power. In zooming from the wide-angle end to the telephoto end, in each embodiment of the present invention, the distance between the first lens group $G_1$ and the second lens group $G_2$ is increased, and the distance between the second lens group $G_2$ and the third lens group $G_3$ is decreased. In the third to fifth embodiments, in zooming from the wide-angle end to the telephoto end, the distance between the front group $G_F$ and the rear group $G_R$ is also changed.

In each embodiment, to correct blurring of the photographic frame, the rear group $G_R$ is movable in a direction almost perpendicular to the optical axis.

Each embodiment of the present invention will be described below. In the technical specifications of each embodiment, f represents the focal length; F, the f-number; and 2ω, the field angle. A numeric value at the left end represents the order from the object side; r, the radius of curvature of a lens surface; d, a distance between lens surfaces; and n and ν, values of the refractive index and the Abbe number, respectively, corresponding to d-lines (λ=587.6 nm).

[First Embodiment]

Figure 1:
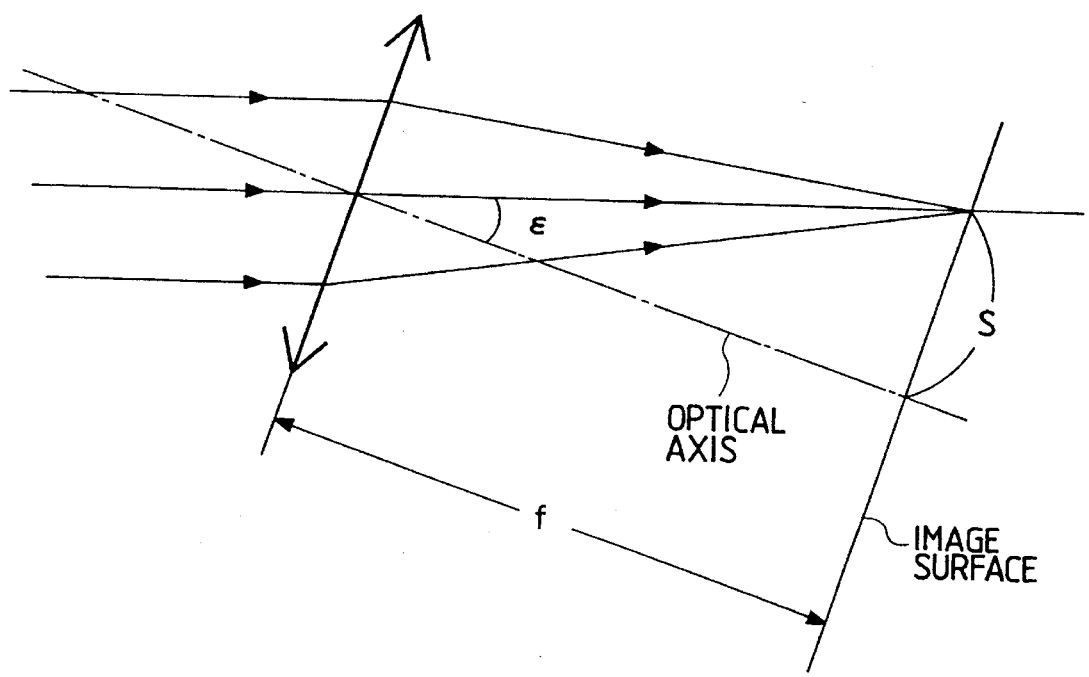
FIG. 1 is a view showing a state in which blurring occurs with an inclination e of a lens system.
Figure 2:
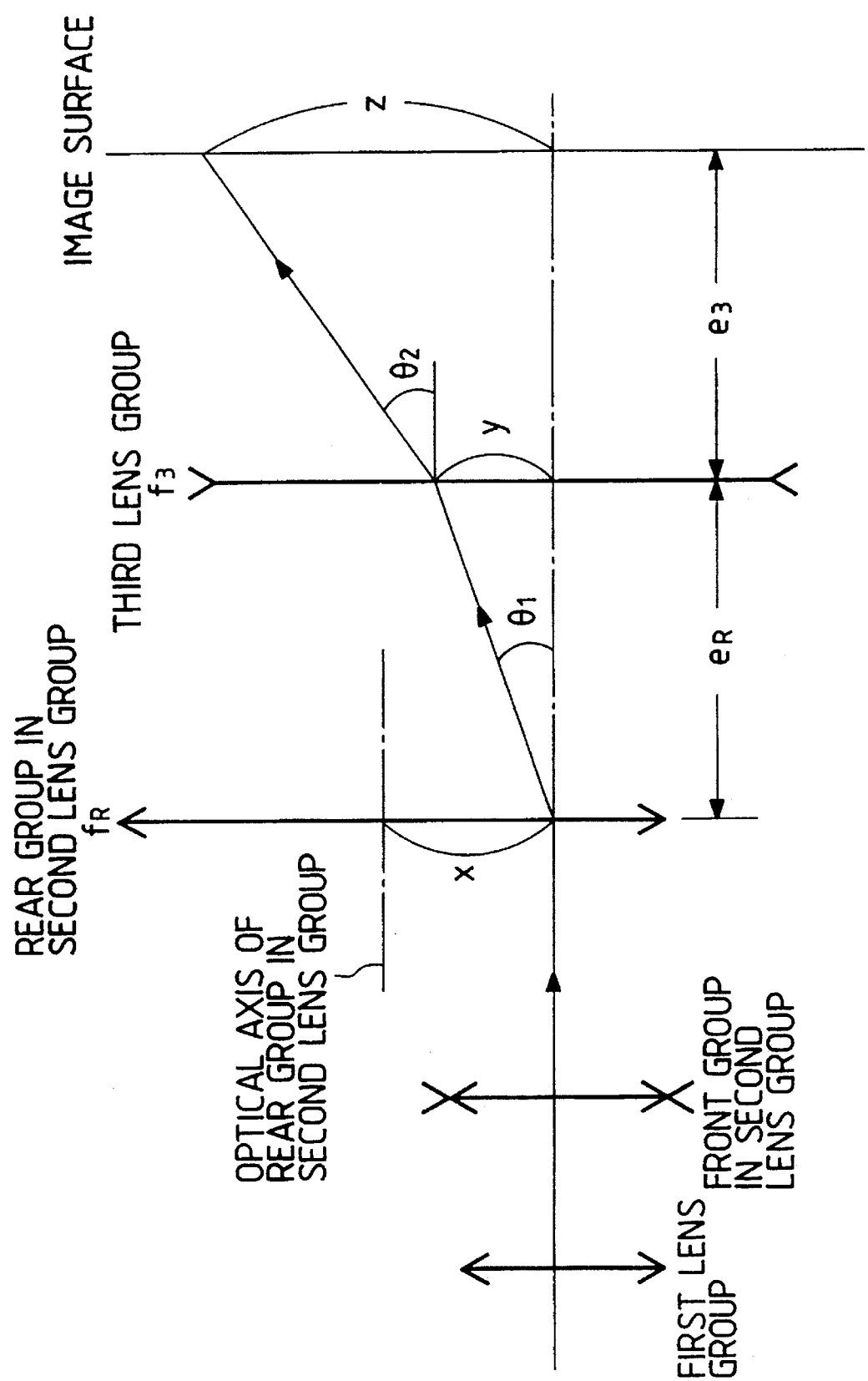
FIG. 2 is a view showing a state in which a hand shake lens prevention lens group is decentered.
Figure 3:
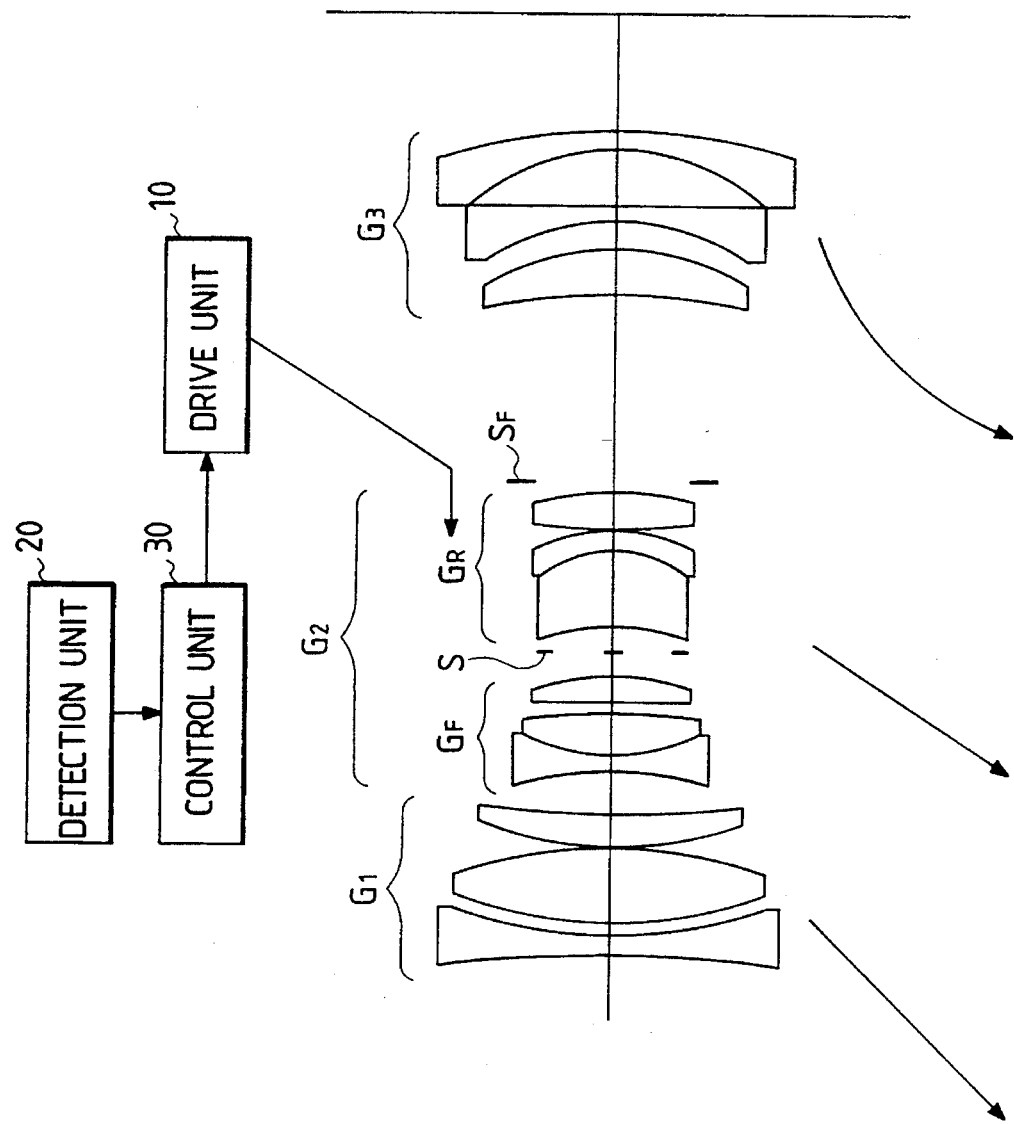
FIG. 3 is a view showing the lens structure of the first embodiment.

FIG. 3 shows the lens structure of the first embodiment. The lens structure comprises a first lens group $G_1$, a front group $G_F$ of a second lens group $G_2$, a stop S, a rear group $G_R$ of the second lens group $G_2$, and a third lens group $G_3$ the order from the object side. The first lens group $G_1$ consists of a double-concave negative lens, a double-convex positive lens, and a positive meniscus lens having a convex surface facing the object side, all of which are located in the order from the object side. The front group $G_F$ of the second lens group consists of a lens obtained by bonding a double-concave negative lens and a double-convex positive lens, and a positive meniscus lens having a concave surface facing the object side, all of which are located in the order from the object side. The rear group $G_R$ consists of a lens obtained by bonding a positive meniscus lens having a concave surface facing the object side and a negative meniscus lens having a concave surface facing the object side, and a double-convex positive lens, all of which are located in the order from the object side. The third lens $G_3$ consists of a positive meniscus lens having a concave surface facing the object side, a negative meniscus lens having a concave surface facing the object side, and a negative meniscus lens having a concave surface facing the object side, all of which are located in the order from the object side.

In this embodiment, the rear group $G_R$ is arranged to be movable in a direction almost perpendicular to the optical axis. A drive unit 10 moves this rear group $G_R$ in a direction perpendicular to the optical axis. A detection unit 20 detects blurring of a photographic image and can be constituted by, e.g., an angular velocity detection sensor or the like. A control unit 30 calculates a movement amount of the rear group $G_R$ on the basis of an output from the detection unit 20 and controls the drive unit 10 to move the rear group $G_R$ by the calculated movement amount.

In each embodiment to be described later, for the sake of descriptive or illustrative convenience, the drive unit 10, the detection unit 20, and the control unit 30 are not illustrated or described.

The specification values of the first embodiment according to the present invention are summarized in Table 1 below. Note that the maximum image height is H=21.6 mm.

TABLE 1 f = 39.00–102.00
F = 4.08 –8.05
2ω = 58.20–23.32°

| | r | d | v | n |
|---|---|---|---|---|
| 1 | –114.155 | 1.50 | 33.9 | 1.80384 |
| 2 | 34.074 | 1.00 | | |
| 3 | 34.383 | 5.30 | 54.0 | 1.61720 |
| 4 | –45.270 | 0.10 | | |
| 5 | 30.065 | 2.60 | 60.1 | 1.62041 |
| 6 | 73.586 | (d6) | | |
| 7 | –22.875 | 1.10 | 46.5 | 1.80411 |
| 8 | 13.576 | 3.10 | 28.2 | 1.74000 |
| 9 | –88.720 | 0.80 | | |
| 10 | –491.918 | 2.00 | 64.1 | 1.51680 |
| 11 | –19.079 | 2.00 | | |
| 12 | (stop) | 2.00 | | |
| 13 | –14.370 | 5.70 | 69.9 | 1.51860 |
| 14 | –9.069 | 1.40 | 23.0 | 1.86074 |
| 15 | –13.774 | 0.10 | | |
| 16 | 70.726 | 2.70 | 69.9 | 1.51860 |
| 17 | –26.349 | (d17) | | |
| 18 | –47.072 | 3.40 | 27.6 | 1.75520 |
| 19 | –18.922 | 2.20 | | |
| 20 | –17.796 | 1.30 | 43.3 | 1.84042 |
| 21 | –124.763 | 4.00 | | |
| 22 | –16.876 | 1.40 | 55.6 | 1.69680 |
| 23 | –46.779 | (B.f) | | |

(Variable Interval in Zooming)

| f | 38.9998 | 69.9996 | 101.9998 |
|---|---|---|---|
| d6 | 3.2347 | 10.3035 | 17.0677 |
| d17 | 15.0298 | 7.2691 | 3.1954 |
| B.f | 8.9728 | 31.0851 | 48.8923 |

(Condition Correspondence Values)

(1) KW/H = 0.044
(2) KT/(Z · H) = 0.031
(3) D/fR = 0.159
(4) R/fR = –0.401
(5) vP – vN = 46.9
(6) KW = 0.950
(7) KT/Z = 0.363

[Second Embodiment]

Figure 4:
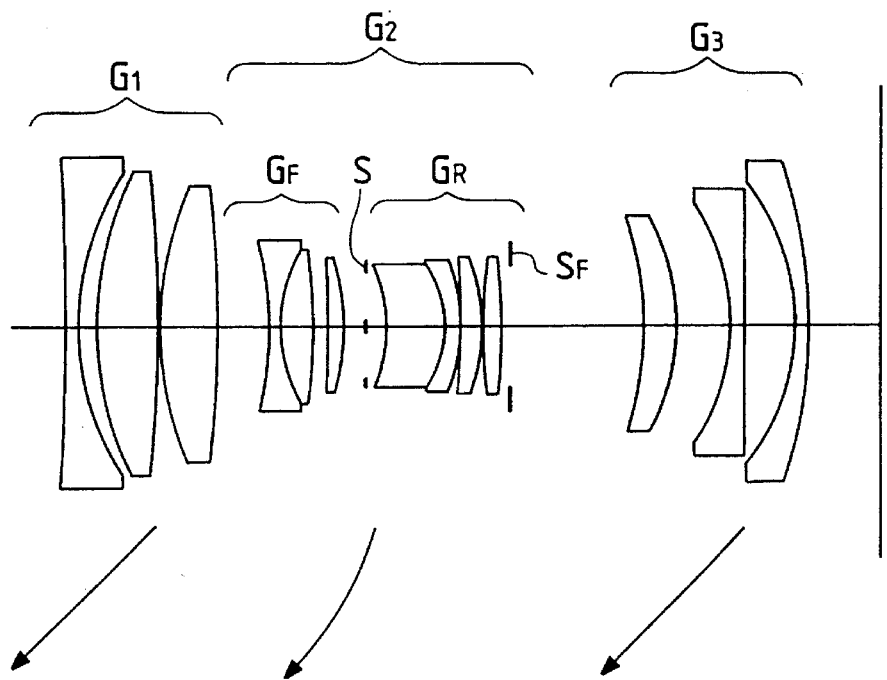
FIG. 4 is a view showing the lens structure of the second embodiment.

FIG. 4 shows the lens structure of the second embodiment. The lens structure comprises a first lens group $G_1$, a front group $G_F$ of a second lens group $G_2$, a stop S, a rear group $G_R$ of the second lens group $G_2$, and a third lens group $G_3$ in an order from the object side. The first lens group $G_1$ consists of a double-concave negative lens, a double-convex positive lens, and a double-convex positive lens, all of which are located in the order from the object side. The front group $G_F$ of the second lens group consists of a lens obtained by bonding a double-concave negative lens and a double-convex positive lens, and a positive meniscus lens having a concave surface facing the object side, all of which are located in the order from the object side. The rear group $G_R$ consists of a lens obtained by bonding a positive meniscus lens having a concave surface facing the object side and a negative meniscus lens having a concave surface facing the object side, a positive meniscus lens having a concave surface facing the object side, and a double-convex positive lens, all of which are located in the order from the object side. The third lens $G_3$ consists of a positive meniscus lens having a concave surface facing the object side, a meniscus lens having a concave shape close to a planoconcave shape and having a concave surface facing the object side, and a negative meniscus lens having a concave surface facing the object side, all of which are located in the order from the object side.

Note that the first and third lens groups $G_1$ and $G_3$ are moved together in zooming.

The specification values of the second embodiment according to the present invention are summarized in Table 2 below. Note that the maximum image height is H =21.6 mm.

TABLE 2 f = 38.96–101.99
F = 3.92–8.14
2ω = 57.32–23.49°

| | r | d | v | n |
|---|---|---|---|---|
| 1 | –270.801 | 1.50 | 43.3 | 1.84042 |
| 2 | 27.974 | 1.40 | | |
| 3 | 30.217 | 5.80 | 82.6 | 1.49782 |
| 4 | –120.608 | 0.10 | | |
| 5 | 32.131 | 5.50 | 67.9 | 1.59319 |
| 6 | –94.084 | (d6) | | |
| 7 | –30.560 | 1.20 | 46.5 | 1.80411 |
| 8 | 15.695 | 3.00 | 27.6 | 1.74077 |
| 9 | –63.482 | 1.40 | | |
| 10 | –74.613 | 1.50 | 65.7 | 1.46450 |
| 11 | –22.711 | 2.00 | | |
| 12 | (stop) | 2.00 | | |
| 13 | –13.794 | 5.70 | 82.6 | 1.49782 |
| 14 | –9.913 | 1.40 | 23.8 | 1.84666 |
| 15 | –16.252 | 0.10 | | |
| 16 | –46.718 | 2.00 | 70.4 | 1.48749 |
| 17 | –17.605 | 0.10 | | |
| 18 | 58.479 | 1.70 | 70.4 | 1.48749 |
| 19 | –51.884 | (d19) | | |
| 20 | –25.121 | 3.00 | 25.4 | 1.80518 |
| 21 | –20.048 | 5.20 | | |
| 22 | –19.167 | 1.30 | 60.0 | 1.64000 |
| 23 | –10668.908 | 5.00 | | |
| 24 | –20.265 | 1.40 | 60.0 | 1.64000 |
| 25 | –42.976 | (B.f) | | |

(Variable Interval in Zooming)

| f | 38.9614 | 69.9603 | 101.9946 |
|---|---|---|---|
| d6 | 4.8200 | 12.6413 | 16.3480 |
| d17 | 13.6289 | 5.8075 | 2.1009 |
| B.f | 6.7975 | 28.2677 | 49.6732 |

(Condition Correspondence Values)

(1) KW/H = 0.045
(2) KT/(Z · H) = 0.034
(3) D/fR = 0.168

TABLE 2-continued $f = 38.96–101.99$
$F = 3.92–8.14$
$2\omega = 57.32–23.49°$

| r | d | ν | n |
|---|---|---|---|

(4) R/fR = −0.406
(5) νP − νN = 50.7
(6) KW = 0.975
(7) KT/Z = 0.733

[Third Embodiment]

Figure 5:
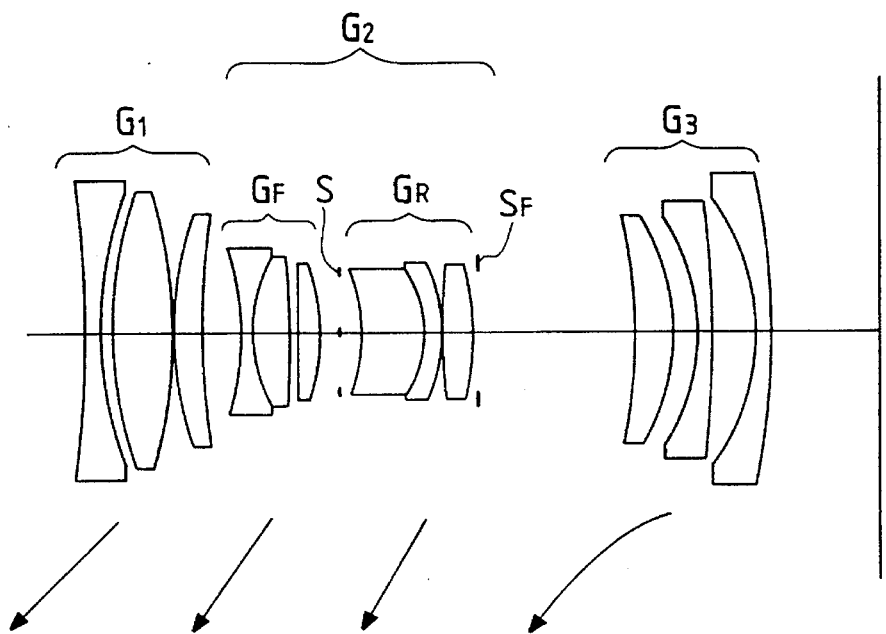
FIG. 5 is a view showing the lens structure of the third embodiment.

FIG. 5 shows the lens structure of the third embodiment. The lens structure comprises a first lens group $G_1$, a front group $G_F$, a stop S, a rear group $G_R$, and a third lens group $G_3$ in the order from the object side. The first lens group $G_1$ consists of a double-concave negative lens, a double-convex positive lens, and a positive meniscus lens having a concave surface facing the object side, all of which are located in the order from the object side. The front group $G_F$ consists of a lens obtained by bonding a double-concave negative lens and a double-convex positive lens, and a positive meniscus lens having a concave surface facing the object side, all of which are located in the order from the object side. The rear group $G_R$ consists of a lens obtained by bonding a positive meniscus lens having a concave surface facing the object side and a negative meniscus lens having a concave surface facing the object side, and a double-convex positive lens, all of which are located in the order from the object side. The third lens $G_3$ consists of a positive meniscus lens having a concave surface facing the object side, a negative meniscus lens having a concave surface facing the object side, and a negative meniscus lens having a concave surface facing the object side, all of which are located in the order from the object side. In zooming from the wide-angle end to the telephoto end, the distance between the first lens group $G_1$ and the front group $G_F$ is increased, the distance between the front group $G_F$ and the rear group $G_R$ is increased, the distance between the rear group $G_R$ and the third lens group $G_3$ is decreased, and the stop S is moved together with the rear group $G_R$.

Note that the front and rear groups $G_F$ and $G_R$ constitute a second lens group $G_2$.

The specification values of the third embodiment according to the present invention are summarized in Table 3 below. Note that the maximum image height is H=21.6 mm.

TABLE 3

$f = 40.00–90.00$
$F = 4.17–7.23$
$2\omega = 55.96–26.28°$

| | r | d | ν | n |
|---|---|---|---|---|
| 1 | −117.413 | 1.50 | 33.9 | 1.80384 |
| 2 | 33.668 | 1.00 | | |
| 3 | 33.691 | 5.30 | 60.1 | 1.62041 |
| 4 | −45.434 | 0.10 | | |
| 5 | 28.965 | 2.60 | 60.1 | 1.62041 |
| 6 | 64.438 | (d6) | | |
| 7 | −22.813 | 1.10 | 46.5 | 1.80411 |
| 8 | 13.717 | 3.10 | 27.6 | 1.74077 |
| 9 | −92.593 | 0.80 | | |
| 10 | −777.560 | 2.00 | 64.1 | 1.51680 |
| 11 | −19.125 | (d11) | | |
| 12 | (stop) | 2.00 | | |
| 13 | −14.370 | 5.70 | 69.9 | 1.51860 |
| 14 | −9.069 | 1.40 | 23.0 | 1.86074 |
| 15 | −13.774 | 0.10 | | |

TABLE 3-continued $f = 40.00–90.00$
$F = 4.17–7.23$
$2\omega = 55.96–26.28°$

| | r | d | ν | n |
|---|---|---|---|---|
| 16 | 70.726 | 2.70 | 69.9 | 1.51860 |
| 17 | −26.349 | (d17) | | |
| 18 | −42.936 | 3.40 | 27.6 | 1.75520 |
| 19 | −18.726 | 2.20 | | |
| 20 | −17.565 | 1.30 | 43.3 | 1.84042 |
| 21 | −81.915 | 4.00 | | |
| 22 | −18.575 | 1.40 | 53.9 | 1.71300 |
| 23 | −67.331 | (B.f) | | |

(Variable Interval in Zooming)

| f | 40.0000 | 60.0002 | 90.0010 |
|---|---|---|---|
| d6 | 3.4530 | 7.7565 | 13.8317 |
| d11 | 1.7456 | 3.1801 | 5.2051 |
| d17 | 14.5896 | 9.0052 | 4.3151 |
| B.f | 9.8791 | 24.0708 | 40.9121 |

(Condition Correspondence Values)

(1) KW/H = 0.045
(2) KT/(Z · H) = 0.032
(3) D/fR = 0.159
(4) R/fR = −0.401
(5) νP − νN = 46.9
(6) KW = 0.970
(7) KT/Z = 0.702

[Fourth Embodiment]

Figure 6:
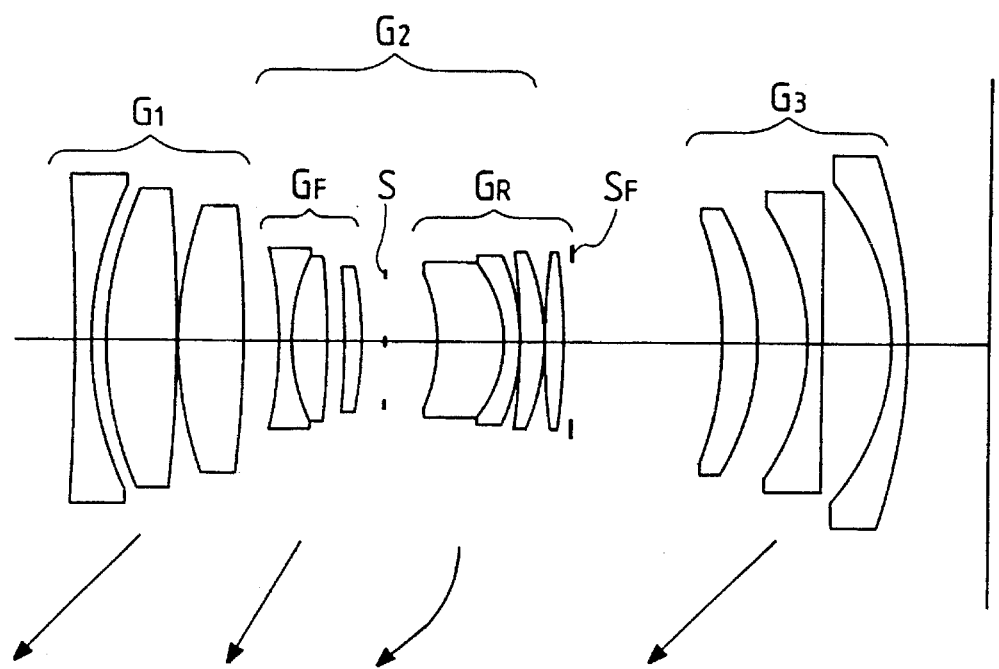
FIG. 6 is a view showing the lens structure of the fourth embodiment.

FIG. 6 shows the lens structure of the fourth embodiment. The lens structure comprises a first lens group $G_1$, a negative front group $G_F$, a stop S, a positive rear group $G_R$, and a third lens group $G_3$ in an order from the object side. The first lens group $G_1$ consists of a double-concave negative lens, a double-convex positive lens, and a double-convex positive lens, all of which are located in the order from the object side. The negative front group $G_F$ consists of a lens obtained by bonding a double-concave negative lens and a double-convex positive lens, and a positive meniscus lens having a concave surface facing the object side, all of which are located in the order from the object side. The positive rear group $G_R$ consists of a lens obtained by bonding a positive meniscus lens having a concave surface facing the object side and a negative meniscus lens having a concave surface facing the object side, a positive meniscus lens having a concave surface facing the object side, and a double-convex positive lens, all of which are located in the order from the object side. The third lens $G_3$ consists of a positive meniscus lens having a concave surface facing the object side, a negative meniscus lens having a concave surface facing the object side, and a negative meniscus lens having a concave surface facing the object side, all of which are located in the order from the object side. In zooming from the wide-angle end to the telephoto end, the distance between the first lens group $G_1$ and the front group $G_F$ is increased, the distance between the front group $G_F$ and the rear group $G_R$ is changed, the distance between the rear group $G_R$ and the third lens group $G_3$ is decreased, the first lens group $G_1$ and the third lens group $G_3$ are moved together, and the stop S is moved together with the front group $G_F$.

Note that the front and rear groups $G_F$ and $G_R$ constitute a second lens group $G_2$.

The specification values of the fourth embodiment according to the present invention are summarized in Table 4 below. Note that the maximum image height is H =21.6 mm.

TABLE 4 f = 39.00–90.00
F = 4.04–7.15
2ω = 57.26–26.32°

| | r | d | ν | n |
|---|---|---|---|---|
| 1 | −283.994 | 1.50 | 43.3 | 1.84042 |
| 2 | 28.414 | 1.40 | | |
| 3 | 31.513 | 5.80 | 82.6 | 1.49782 |
| 4 | −123.349 | 0.10 | | |
| 5 | 33.106 | 5.50 | 67.9 | 1.59319 |
| 6 | −84.046 | (d6) | | |
| 7 | −31.488 | 1.20 | 46.5 | 1.80411 |
| 8 | 17.072 | 3.00 | 27.6 | 1.74077 |
| 9 | −62.389 | 1.40 | | |
| 10 | −64.722 | 1.50 | 82.6 | 1.49782 |
| 11 | −23.955 | 2.00 | | |
| 12 | (stop) | (d12) | | |
| 13 | −13.794 | 5.70 | 82.6 | 1.49782 |
| 14 | −9.913 | 1.40 | 23.8 | 1.84666 |
| 15 | −16.252 | 0.10 | | |
| 16 | −46.718 | 2.00 | 70.4 | 1.48749 |
| 17 | −17.605 | 0.10 | | |
| 18 | 58.479 | 1.70 | 70.4 | 1.48749 |
| 19 | −51.884 | (d19) | | |
| 20 | −27.261 | 3.00 | 25.4 | 1.80518 |
| 21 | −20.085 | 4.20 | | |
| 22 | −19.025 | 1.30 | 60.0 | 1.64000 |
| 23 | −517.081 | 6.00 | | |
| 24 | −18.714 | 1.40 | 60.0 | 1.64000 |
| 25 | −43.972 | (B.f) | | |

(Variable Interval in Zooming)

| f | 39.0003 | 60.0010 | 90.0031 |
|---|---|---|---|
| d6 | 2.9999 | 8.8761 | 16.5386 |
| d12 | 4.4770 | 4.6135 | 1.4980 |
| d19 | 13.5729 | 7.5602 | 3.0131 |
| B.f | 6.8850 | 21.5761 | 40.7340 |

(Condition Correspondence Values)

(1) KW/H = 0.045
(2) KT/(Z · H) = 0.034
(3) D/fR = 0.168
(4) R/fR = −0.406
(5) νP − νN = 50.7
(6) KW = 0.976
(7) KT/Z = 0.735

[Fifth Embodiment]

Figure 7:
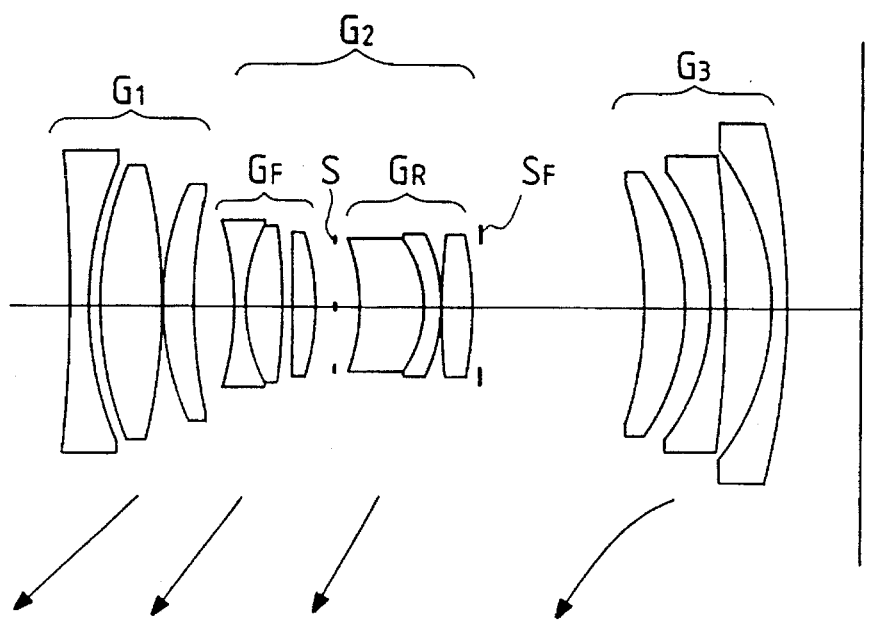
FIG. 7 is a view showing the lens structure of the fifth embodiment.

FIG. 7 shows the lens structure of the fifth embodiment. The lens structure comprises a first lens group $G_1$, a positive front group $G_F$, a stop S, a positive rear group $G_R$, and a third lens group $G_3$ in the order from the object side. The first lens group $G_1$ consists of a double-concave negative lens, a double-convex positive lens, and a positive meniscus lens having a convex surface facing the object side, all of which are located in the order from the object side. The positive front group $G_F$ consists of a lens obtained by bonding a double-concave negative lens and a double-convex positive lens, and a positive meniscus lens having a concave surface facing the object side, all of which are located in the order from the object side. The positive rear group $G_R$ consists of a lens obtained by bonding a positive meniscus lens having a concave surface facing the object side and a negative meniscus lens having a concave surface facing the object side, and a double-convex positive lens, all of which are located in the order from the object side. The third lens $G_3$ consists of a positive meniscus lens having a concave surface facing the object side, a negative meniscus lens having a concave surface facing the object side, and a negative meniscus lens having a concave surface facing the object side, all of which are located in the order from the object side. In zooming from the wide-angle end to the telephoto end, the distance between the first lens group $G_1$ and the front group $G_F$ is increased, the distance between the front group $G_F$ and the rear group $G_R$ is increased, the distance between the rear group $G_R$ and the third lens group $G_3$ is decreased, and the stop S is moved together with the rear group $G_R$.

Note that the front and rear groups $G_F$ and $G_R$ constitute a second lens group $G_2$.

The specification values of the fifth embodiment according to the present invention are summarized in Table 5 below. Note that the maximum image height is H=21.6 mm.

TABLE 5 f = 36.30–77.89
F = 3.69–6.09
2ω = 60.82–29.94°

| | r | d | ν | n |
|---|---|---|---|---|
| 1 | −140.041 | 1.50 | 33.9 | 1.80384 |
| 2 | 28.595 | 1.00 | | |
| 3 | 29.422 | 5.30 | 60.1 | 1.62041 |
| 4 | −43.637 | 0.10 | | |
| 5 | 23.362 | 2.60 | 60.1 | 1.62041 |
| 6 | 43.413 | (d6) | | |
| 7 | −22.611 | 1.10 | 46.5 | 1.80411 |
| 8 | 14.355 | 3.10 | 27.6 | 1.74077 |
| 9 | −57.808 | 0.80 | | |
| 10 | −160.210 | 2.00 | 69.9 | 1.51860 |
| 11 | −19.004 | (d11) | | |
| 12 | (stop) | 2.00 | | |
| 13 | −14.370 | 5.70 | 69.9 | 1.51860 |
| 14 | −9.069 | 1.40 | 23.0 | 1.86074 |
| 15 | −13.774 | 0.10 | | |
| 16 | 70.726 | 2.70 | 69.9 | 1.51860 |
| 17 | −26.349 | (d17) | | |
| 18 | −31.599 | 3.40 | 28.6 | 1.79504 |
| 19 | −18.398 | 2.20 | | |
| 20 | −17.490 | 1.30 | 43.3 | 1.84042 |
| 21 | −90.003 | 4.00 | | |
| 22 | −19.905 | 1.40 | 53.9 | 1.71300 |
| 23 | −54.400 | (B.f) | | |

(Variable Interval in Zooming)

| f | 36.2987 | 53.7011 | 77.8900 |
|---|---|---|---|
| d6 | 3.3902 | 7.6939 | 13.7691 |
| d11 | 1.6192 | 3.0534 | 5.0785 |
| d17 | 14.6856 | 9.1012 | 4.4111 |
| B.f | 6.1974 | 18.0722 | 30.2871 |

(Condition Correspondence Values)

(1) KW/H = 0.038
(2) KT/(Z · H) = 0.026
(3) D/fR = 0.159
(4) R/fR = −0.401
(5) νP − νN = 46.9
(6) KW = 0.810
(7) KT/Z = 0.550

In focusing from the infinity to the closest focusing distance, a method of moving the third lens group $G_3$ in the direction of the image surface is suitable because a change in image formation performance and a focusing movement amount are small.

The second lens group $G_2$ or only the rear group $G_R$ of the second lens group $G_2$ may be moved in the direction of the object to perform focusing.

In each embodiment, the stationary stop $S_F$ serving as a so-called flare stopper is preferably arranged on the image side (i.e., image side of the rear group $G_R$) of the second lens group $G_2$. The stationary stop $S_F$ is preferably moved together with the second lens group $G_2$ in the direction of the optical axis upon zooming and is preferably stationary when the rear group $G_R$ of the second lens group $G_2$ is moved in the direction perpendicular to the optical axis to prevent the hand shake. Even if the rear group $G_R$ of the second lens group $G_2$ is decentered in the hand shake prevention operation, the stationary stop $S_F$ can limit hazardous flare light.

What is claimed is:

1. A zoom lens including a first lens group $G_1$ having positive refractive power, a second lens group $G_2$ having positive refractive power, and a third lens group $G_3$ having negative refractive power in the order from the object side, wherein in zooming from a wide-angle end to a telephoto end, a distance between said first lens group $G_1$ and said second lens group $G_2$ is increased and a distance between said second lens group $G_2$ and said third lens group $G_3$ is decreased, and said second lens group $G_2$ includes a front group $G_F$ having low refractive power and a rear group $G_R$ having positive refractive power in the order from the object side, said rear group $G_R$ being movable in a direction substantially perpendicular to an optical axis.

2. A lens according to claim 1, wherein said zoom lens satisfies the following conditions:

$$0.02 \leq KW/H \leq 0.1$$

$$0.02 \leq KT/(Z \cdot H) \leq 0.1$$

for $KW=(eRW+e3W)/fR-eRW \cdot e3W/(fR \cdot f3)$ $KT=(eRT+e3T)/fR-eRT \cdot e3T/(fR \cdot f3)$ $Z=fT/fW$ where fR is a focal length of said rear group $G_R$, f3 is a focal length of said third lens group $G_3$, eRW is a principal point distance between said rear group $G_R$ and said third lens group $G_3$ at the wide-angle end, eRT is a principal point distance between said rear group $G_R$ and said third lens group $G_3$ at the telephoto end, e3W is a distance between a principal point of said third lens group $G_3$ and an image point at the wide-angle end, e3T is a distance between a principal point of said third lens group $G_3$ and an image point at the telephoto end, fW is a focal length of a zoom lens system as a whole at the wide-angle end, fT is a focal length of the zoom lens system as a whole at the telephoto end, and H is a maximum image height (unit: mm).

3. A lens according to claim 2, wherein said rear group $G_R$ includes at least one positive lens element LR1, at least one negative lens element, and at least one positive lens element in the order from the object side.

4. A lens according to claim 3, wherein said positive lens element LR1 satisfies the following condition:

$$0.1 \leq D/fR \leq 0.3$$

where fR is the focal length of said rear group $G_R$ and D is a thickness of said positive lens element LR1 on an axis.

5. A lens according to claim 3, wherein said positive lens element LR1 satisfies the following condition:

$$-1.2 \leq R/fR \leq -0.2$$

where fR is the focal length of said rear group $G_R$ and R is a radius of curvature of an object-side lens surface of said positive lens element LR1.

6. A lens according to claim 3, wherein said zoom lens satisfies the following condition:

$$30 \leq vP-vN$$

where vP is an average value of Abbe numbers of positive lens elements of said rear group $G_R$ and vN is an average value of Abbe numbers of negative lens elements in said rear group $G_R$.

7. A lens according to claim 3, wherein said rear group $G_R$ includes a bonded lens element.

8. A lens according to claim 7, wherein said rear group $G_R$ includes a bonded lens element including a positive lens element and a negative lens element, and at least one positive lens element in the order from the object side.

9. A lens according to claim 8, wherein said bonded lens element has a meniscus shape as a whole, whose concave surface faces the object side.

10. A lens according to claim 7, wherein said bonded lens element includes a positive meniscus lens element having a concave surface facing the object side and a negative meniscus lens element having a concave surface facing the object side in the order from the object side.

11. A lens according to claim 2, wherein said first lens group $G_1$ includes at least one negative lens element and at least one positive lens element in the order from the object side.

12. A lens according to claim 2, wherein said front group $G_F$ includes at least one negative lens element and at least one positive lens element in the order from the object side.

13. A lens according to claim 12, wherein said front group $G_F$ includes a bonded lens element including negative and positive lens elements, and at least one positive lens element in the order from the object side.

14. A lens according to claim 2, wherein said second lens group $G_2$ includes a stop S located between said front and rear groups $G_F$ and $G_R$.

15. A lens according to claim 2, further including a flare stopper arranged on an image side of said second lens group $G_2$ and fixed in a direction perpendicular to the optical axis.

16. A lens according to claim 15, wherein said flare stopper is movable together with said second lens group $G_2$ in a direction of the optical axis.

17. A lens according to claim 2, wherein said third lens group $G_3$ is extended toward an image side along the optical axis in focusing from an infinity object to a closest focusing object.

18. A lens according to claim 2, wherein said third lens group $G_3$ includes at least one positive lens element and at least two negative lens elements in the order from the object side.

19. A lens according to claim 2, wherein said zoom lens further satisfies the following condition:

$$KW \leq KT \leq KW \cdot Z$$

20. A lens according to claim 2, further including:

detecting means for detecting blurring of a photographic frame and outputting a detection signal;

driving means for moving said rear group $G_R$ in a direction substantially perpendicular to the optical axis; and control means for controlling said driving means on the basis of the detection signal.

21. A lens according to claim 1, wherein a distance between said front and rear groups $G_F$ and $G_R$ is changed in zooming from the wide-angle end to the telephoto end.

22. A lens according to claim 21, wherein said zoom lens satisfies the following conditions:

$$0.02 \leq KW/H \leq 0.1$$

$$0.02 \leq KT/(Z \cdot H) \leq 0.1$$

for $KW=(eRW+e3W)/fR-eRW \cdot e3W/(fR \cdot f3)$

KT=(eRT+e3T)/fR−eRT·e3T/(fR·f3)

Z=fT/fW where fR is a focal length of said rear group $G_R$, f3 is a focal length of said third lens group $G_3$, eRW is a principal point distance between said rear group $G_R$ and said third lens group $G_3$ at the wide-angle end, eRT is a principal point distance between said rear group $G_R$ and said third lens group $G_3$ at the telephoto end, e3W is a distance between a principal point of said third lens group $G_3$ and an image point at the wide-angle end, e3T is a distance between a principal point of said third lens group $G_3$ and an image point at the telephoto end, fW is a focal length of a zoom lens system as a whole at the wide-angle end, fT is a focal length of the zoom lens system as a whole at the telephoto end, and H is a maximum image height (unit: mm).

23. A lens according to claim 22, wherein said rear group $G_R$ includes at least one positive lens element LR1, at least one negative lens element, and at least one positive lens element in the order from the object side.

24. A lens according to claim 23, wherein said positive lens element LR1 satisfies the following condition:

$$0.1 \leq D/fR \leq 0.3$$

where fR is the focal length of said rear group $G_R$ and D is a thickness of said positive lens element LR1 on an axis.

25. A lens according to claim 23, wherein said positive lens element LR1 satisfies the following condition:

$$-1.2 \leq R/fR \leq -0.2$$

where fR is the focal length of said rear group $G_R$ and R is a radius of curvature of an object-side lens surface of said positive lens element LR1.

26. A lens according to claim 23, wherein said zoom lens satisfies the following condition:

$$30 \leq vP - vN$$

where vP is an average value of Abbe numbers of positive lens elements of said rear group $G_R$ and vN is an average value of Abbe numbers of negative lens elements in said rear group $G_R$.

27. A lens according to claim 23, wherein said rear group $G_R$ includes a bonded lens element.

28. A lens according to claim 27, wherein said rear group $G_R$ includes a bonded lens element including a positive lens element and a negative lens element, and at least one positive lens element in the order from the object side.

29. A lens according to claim 28, wherein said bonded lens element has a meniscus shape whose as a whole, concave surface faces the object side.

30. A lens according to claim 27, wherein said bonded lens element includes a positive meniscus lens element having a concave surface facing the object side and a negative meniscus lens element having a concave surface facing the object side in the order from the object side.

31. A lens according to claim 22, wherein said zoom lens further satisfies the following condition:

$$KW \leq KT \leq KW \cdot Z$$

32. A lens according to claim 22, wherein said first lens group $G_1$ includes at least one negative lens element and at least one positive lens element in the order from the object side.

33. A lens according to claim 22, wherein said front group $G_F$ includes at least one negative lens element and at least one positive lens element in the order from the object side.

34. A lens according to claim 33, wherein said front group $G_F$ includes a bonded lens element including negative and positive lens elements, and at least one positive lens element in the order from the object side.

35. A lens according to claim 22, wherein said second lens group $G_2$ includes a stop S located between said front and rear groups $G_F$ and $G_R$.

36. A lens according to claim 35, wherein said stop S is movable together with said rear group in a direction of the optical axis.

37. A lens according to claim 22, further including a flare stopper arranged on an image side of said second lens group $G_2$ and fixed in a direction perpendicular to the optical axis.

38. A lens according to claim 37, wherein said flare stopper is movable together with said second lens group $G_2$ in a direction of the optical axis.

39. A lens according to claim 22, wherein said third lens group $G_3$ is extended toward an image side along the optical axis in focusing from an infinity object to a closest focusing object.

40. A lens according to claim 22, wherein said third lens group $G_3$ includes at least one positive lens element and at least two negative lens elements in the order from the object side.

41. A lens according to claim 22, further including:

detecting means for detecting blurring of a photographic frame and outputting a detection signal;

driving means for moving said rear group $G_R$ in a direction substantially perpendicular to the optical axis; and control means for controlling said driving means on the basis of the detection signal.

42. A Leica-size photographic zoom lens including a first lens group $G_1$ having positive refractive power, a second lens group $G_2$ having positive refractive power, and a third lens group $G_3$ having negative refractive power in the order form the object side, wherein in zooming from a wide-angle end to a telephoto end, a distance between said first lens group $G_1$ and said second lens group $G_2$ is increased and a distance between said second lens group $G_2$ and said third lens group $G_3$ is decreased, said second lens group $G_2$ includes a front group $G_F$ having low refractive power and a rear group $G_R$ having positive refractive power in the order from the object side, said rear group $G_R$ being movable in a direction substantially perpendicular to an optical axis, and said zoom lens satisfies the following conditions:

$$0.5 \leq KW \leq 1.8$$

$$0.5 \leq KT/Z \leq 1.8$$

for

KW=(eRW+e3W)/fR−eRW·e3W/(fR·f3)

KT=(eRT+e3T)/fR−eRT·e3T/(fR·f3)

Z=fT/fW where fR is a focal length of said rear group $G_R$, f3 is a focal length of said third lens group $G_3$, eRW is a principal point distance between said rear group $G_R$ and said third lens group $G_3$ at the wide-angle end, eRT is a principal point distance between said rear group $G_R$ and said third lens group $G_3$ at the telephoto end, e3W is a distance between a principal point of said third lens group $G_3$ and an image point at the wide-angle end, e3T is a distance between the principal point of said third lens group $G_3$ and an image point at the telephoto end, fW is a focal length of a zoom lens system as a whole at the wide-angle end, and fT is a focal length of the zoom lens system as a whole at the telephoto end.

43. A lens according to claim 42, wherein said zoom lens satisfies the following condition:

$$KW \leq KT \leq KW \cdot Z$$

44. A lens according to claim 42, wherein a distance between said front and rear groups $G_F$ and $G_R$ is changed in zooming from the wide-angle end to the telephoto end.

45. A zoom lens including a first lens group $G_1$ having positive refractive power, a second lens group $G_2$ including a front group $G_F$ having low refractive power and a rear group $G_R$ having positive refractive power, and a third lens group $G_3$ having negative refractive power, wherein in zooming from a wide-angle end to a telephoto end, a distance between said first lens group $G_1$ and said second lens group $G_2$ is increased, a distance between said front group $G_F$ and said rear group $G_R$ is changed, and a distance between said second lens group $G_2$ and said third lens group $G_3$ is decreased, said rear group $G_R$ being movable in a direction substantially perpendicular to an optical axis, and said zoom lens satisfies the following conditions:

$$0.02 \leq KW/H \leq 0.1$$

$$0.02 \leq KT/(Z \cdot H) \leq 0.1$$

for

KW=(eRW+e3W)/fR−eRW·e3W/(fR·f3)
KT=(eRT+e3T)/fR−eRT·e3T/(fR·f3)
Z=fT/fW where fR is a focal length of said rear group $G_R$, f3 is a focal length of said third lens group $G_3$, eRW is a principal point distance between said rear group $G_R$ and said third lens group $G_3$ at the wide-angle end, eRT is a principal point distance between said rear group $G_R$ and said third lens group $G_3$ at the telephoto end, e3W is a distance between a principal point of said third lens group $G_3$ and an image point at the wide-angle end, e3T is a distance between a principal point of said third lens group $G_3$ and an image point at the telephoto end, fW is a focal length of a zoom lens system as a whole at the wide-angle end, fT is a focal length of the zoom lens system as a whole at the telephoto end, and H is a maximum image height (unit: mm).

46. A lens according to claim 45, wherein said rear group $G_R$ includes at least one positive lens element LR1, at least one negative lens element, and at least one positive lens element in the order from the object side.

47. A lens according to claim 46, wherein said positive lens element LR1 satisfies the following condition:

$$0.1 \leq D/fR \leq 0.3$$

where fR is the focal length of said rear group $G_R$ and D is a thickness of said positive lens element LR1 on an axis.

48. A lens according to claim 46, wherein said positive lens element LR1 satisfies the following condition:

$$-1.2 \leq R/fR \leq -0.2$$

where fR is the focal length of said rear group $G_R$ and R is a radius of curvature of an object-side lens surface of said positive lens element LR1.

49. A lens according to claim 46, wherein said zoom lens satisfies the following condition:

$$30 \leq vP - vN$$

where vP is an average value of Abbe numbers of positive lens elements of said rear group $G_R$ and vN is an average value of Abbe numbers of negative lens elements in said rear group $G_R$.

\* \* \* \* \*